US009374861B2

(12) United States Patent
Kim et al.

(10) Patent No.: US 9,374,861 B2
(45) Date of Patent: Jun. 21, 2016

(54) BACKLIGHT UNIT

(71) Applicant: Samsung Display Co., Ltd., Yongin, Gyeonggi-Do (KR)

(72) Inventors: Kyun Ho Kim, Cheonan-si (KR); Sung In Kang, Hwaseong-si (KR); Woo Jin Lee, Asan-si (KR)

(73) Assignee: Samsung Display Co., Ltd., Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/667,460

(22) Filed: Mar. 24, 2015

(65) Prior Publication Data

US 2015/0373798 A1    Dec. 24, 2015

(30) Foreign Application Priority Data

Jun. 24, 2014  (KR) .................. 10-2014-0077182
Feb. 13, 2015  (KR) .................. 10-2015-0022461

(51) Int. Cl.
*H05B 33/08*     (2006.01)

(52) U.S. Cl.
CPC ........ *H05B 33/0815* (2013.01); *H05B 33/0851* (2013.01)

(58) Field of Classification Search
CPC ........... H05B 33/0815; H05B 33/0851; H05B 33/089; H05B 37/02; H02H 3/06
USPC ................. 315/185 R, 209 R, 291, 307, 308; 345/102
See application file for complete search history.

(56) References Cited

U.S. PATENT DOCUMENTS

| 7,321,206 | B2 | 1/2008 | Kang et al. |
| 8,416,591 | B2 | 4/2013 | Uehara |
| 8,564,211 | B2 | 10/2013 | Kim et al. |
| 8,836,241 | B2 * | 9/2014 | Shiu ..................... H05B 33/089 315/121 |
| 2014/0145626 | A1 | 5/2014 | Choi et al. |

FOREIGN PATENT DOCUMENTS

| KR | 10-2007-0081638 A | 8/2007 |
| KR | 10-2009-0090665 A | 8/2009 |
| KR | 10-2011-0030373 A | 3/2011 |

\* cited by examiner

*Primary Examiner* — Alexander H Taningco
*Assistant Examiner* — Renan Luque
(74) *Attorney, Agent, or Firm* — Robert E. Bushnell, Esq.

(57) ABSTRACT

A backlight unit includes: a light source configured to emit light based on a driving current; a sensing resistor configured to generate a sensing voltage based on the driving current; a first comparator configured to compare the sensing voltage to a first reference voltage divided from a reference power to thereby produce a first comparison signal; a first switching element controlled by the first comparison signal applied from the first comparator to thereby switch the sensing voltage; a second comparator configured to compare the sensing voltage applied via the first switching element to a first ramp signal to thereby produce a second comparison signal; a current control switching element configured to control an amount of the driving current based on the reference power and a current control signal applied from a current controller; an abnormality detector configured to convert the second comparison signal applied from the second comparator into a DC voltage and to compare the DC voltage to a critical voltage to thereby generate a third comparison signal; and a cut-off controller configured to compare the third comparison signal applied from the abnormality detector to a cut-off voltage to control the reference power based on the comparison result.

18 Claims, 6 Drawing Sheets

BACKLIGHT UNIT

CROSS-REFERENCE TO RELATED APPLICATION

This application claims priority to and all benefits accruing under 35 U.S.C. §119 of Korean Patent Applications both Nos. 10-2014-0077182 filed on Jun. 24, 2014 and 10-2015-0022461 filed on Feb. 13, 2015, with the Korean Intellectual Property Office, the disclosure of which are incorporated herein in its entirety by reference.

BACKGROUND OF THE INVENTION

1. Field of the Invention

Embodiments of the present invention relate to a backlight unit capable of preventing damage on elements caused by a short circuit.

2. Description of the Related Art

Liquid crystal displays utilize liquid crystal molecules, which are non-light emitting elements, such that a backlight unit is required so as to produce light.

The backlight unit includes a plurality of light emitting diodes (LEDs) and a light source driver to operate them.

The LEDs are electrically connected to the light source driver by a connector.

Meanwhile, connection failure of the connector may cause a short circuit between anode and cathode terminals of the LED inside the connector. In this case, a high short-circuit current may flow through the light source driver, thereby inflicting a critical damage to elements equipped in the light source driver.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a backlight unit capable of preventing damage on elements caused by a short circuit.

According to an embodiment of the present invention, a backlight unit includes: a light source configured to emit light based on a driving current; a sensing resistor configured to generate a sensing voltage based on the driving current; a first comparator configured to compare the sensing voltage to a first reference voltage divided from a reference power to thereby produce a first comparison signal; a first switching element controlled by the first comparison signal applied from the first comparator to thereby switch the sensing voltage; a second comparator configured to compare the sensing voltage applied via the first switching element to a first ramp signal to thereby produce a second comparison signal; a current control switching element configured to control an amount of the driving current based on the reference power and a current control signal applied from a current controller; an abnormality detector configured to convert the second comparison signal applied from the second comparator into a DC voltage and to compare the DC voltage to a critical voltage to thereby generate a third comparison signal; and a cut-off controller configured to compare the third comparison signal applied from the abnormality detector to a cut-off voltage to control the reference power based on the comparison result.

The backlight unit may further include a first voltage divider configured to generate the first reference voltage.

The first voltage divider may include: a first voltage-dividing resistor configured to receive the reference power through one terminal and connected to an input terminal of the first comparator through another terminal; and a second voltage-dividing resistor connected between the input terminal of the first comparator and ground.

The cut-off controller may drop the reference power to a ground voltage level, when the third comparison signal is greater than the critical voltage.

The abnormality detector may include: a level shifter configured to perform modulation of a voltage level of the second comparison signal applied from the second comparator; an integrator configured to integrate the second comparison signal applied from the level shifter; and a third comparator configured to compare the second comparison signal applied from the integrator to the critical voltage to generate the third comparison signal.

The level shifter may include: a first resistor connected between an output terminal of the second comparator and ground; a first diode connected between the output terminal of the second comparator and a first node; a second resistor configured to receive the reference power through one terminal and connected to the first node through another terminal; a third resistor connected between the first node and ground; a fourth resistor configured to receive the reference power through one terminal and connected to a second node through another terminal; a first pull-down switching element controlled by voltage of the first node and connected between the second node and ground; a fifth resistor configured to receive the reference power through one terminal and connected to a third node through another terminal; and a second pull-down switching element controlled by voltage of the second node and connected between the third node and ground.

The integrator may include: a sixth resistor connected between the second node and an input terminal of the third comparator; and a first capacitor connected between the input terminal of the third comparator and ground.

The backlight unit may further include a second voltage divider configured to generate the critical voltage.

The second voltage divider may include: a third voltage-dividing resistor configured to receive the reference power through one terminal and connected to the input terminal of the third comparator through another terminal; and a fourth voltage-dividing resistor connected between the input terminal of the third comparator and ground.

The backlight unit may further include a power converter configured to convert an externally applied input voltage into a light source driving voltage and apply the light source driving voltage to the light source.

The power converter may include: an inductor and a second diode connected in series between an input terminal and an output terminal of the power converter; a second capacitor connected between the input terminal of the power converter and ground; a third capacitor connected between the output terminal of the power converter and ground; and an output control switching element controlled by an externally supplied output control signal and connected between an anode electrode of the second diode and ground.

The backlight unit may further include: a fourth comparator configured to compare the sensing voltage to a second reference voltage to thereby produce a fourth comparison signal; a fifth comparator configured to compare the fourth comparison signal applied from the fourth comparator to a second ramp signal to produce a fifth comparison signal; and a buffer configured to perform buffering of the fifth comparison signal applied from the fifth comparator using the reference power to thereby produce a light source control signal.

The backlight unit may further include first and second oscillators configured to receive the reference power to produce first and second ramp signals.

The second ramp signal may have a frequency higher than a frequency of the first ramp signal.

The backlight unit may further include a dimming controller configured to receive the reference power to produce a dimming signal and to apply the dimming signal to the current control switching element.

The backlight unit may further include a third diode connected between the dimming controller and the current control switching element.

The light source may include at least one light emitting diode.

The backlight unit may further include a second switching element operating reversely to the first switching element. The second switching element may be controlled by the first comparison signal applied from the first comparator and connected between ground and a connecting point of the first switching element and the input terminal of the first comparator.

According to embodiments of the present invention, a backlight unit may have the following effects.

First, when a short circuit occurs, an amount of the driving current is suppressed, thereby preventing damage on elements such as a sensing resistor.

Second, when the short circuit occurs, a duty ratio of a second comparison signal is increased in accordance with an increase in a sensing voltage, such that a reference power can be more quickly cut-off.

Third, in the case of abnormality, the reference power is not immediately cut-off. Whether to cut-off the reference power or not is determined based on an increase tendency of the sensing voltage, thereby preventing stopping of operation owing to a simple ephemeral noise.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1:
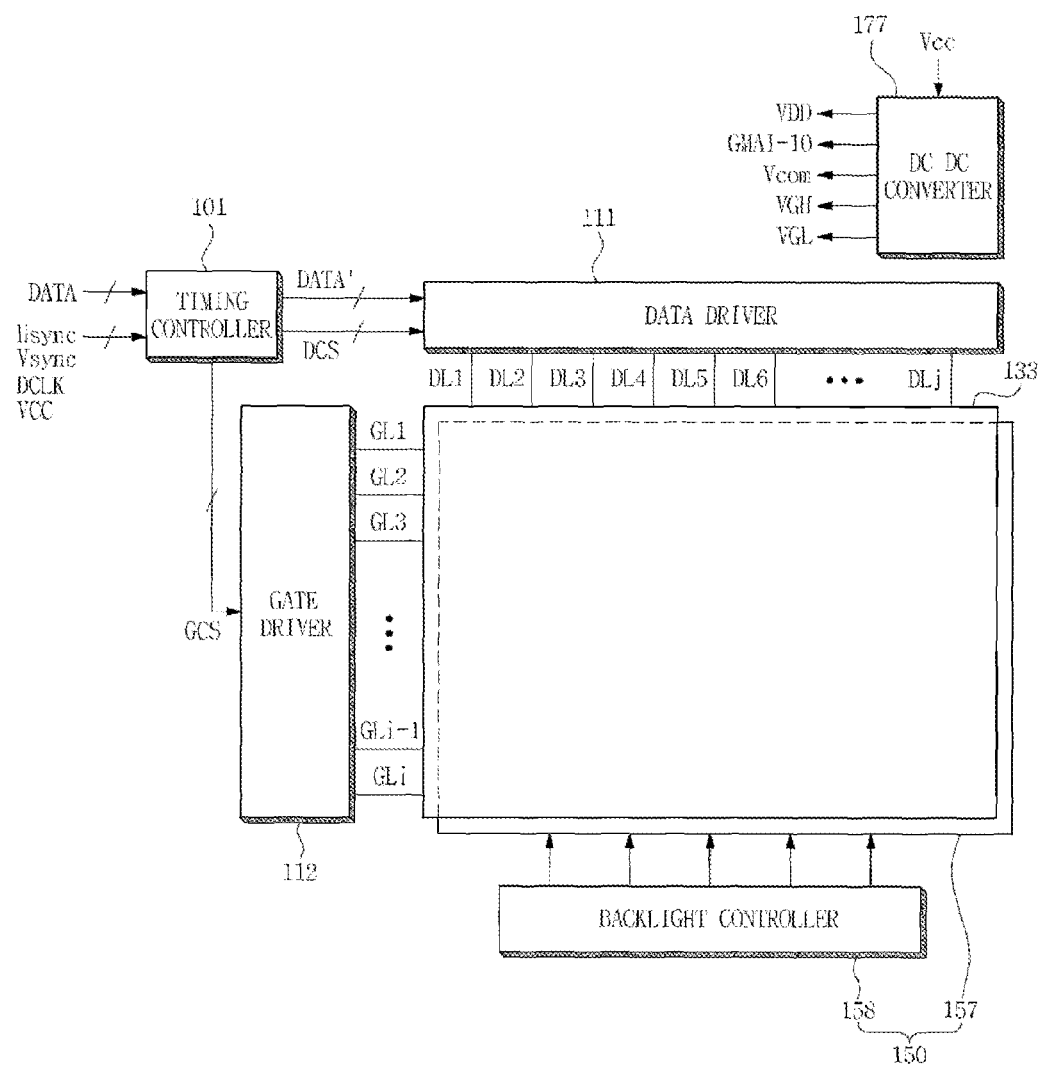
FIG. 1 is a block diagram illustrating a display device according to an embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

In the drawings, thicknesses are illustrated in an enlarged manner in order to clearly describe a plurality of layers and areas. Like reference numbers are used to denote like elements throughout the specification. When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2:
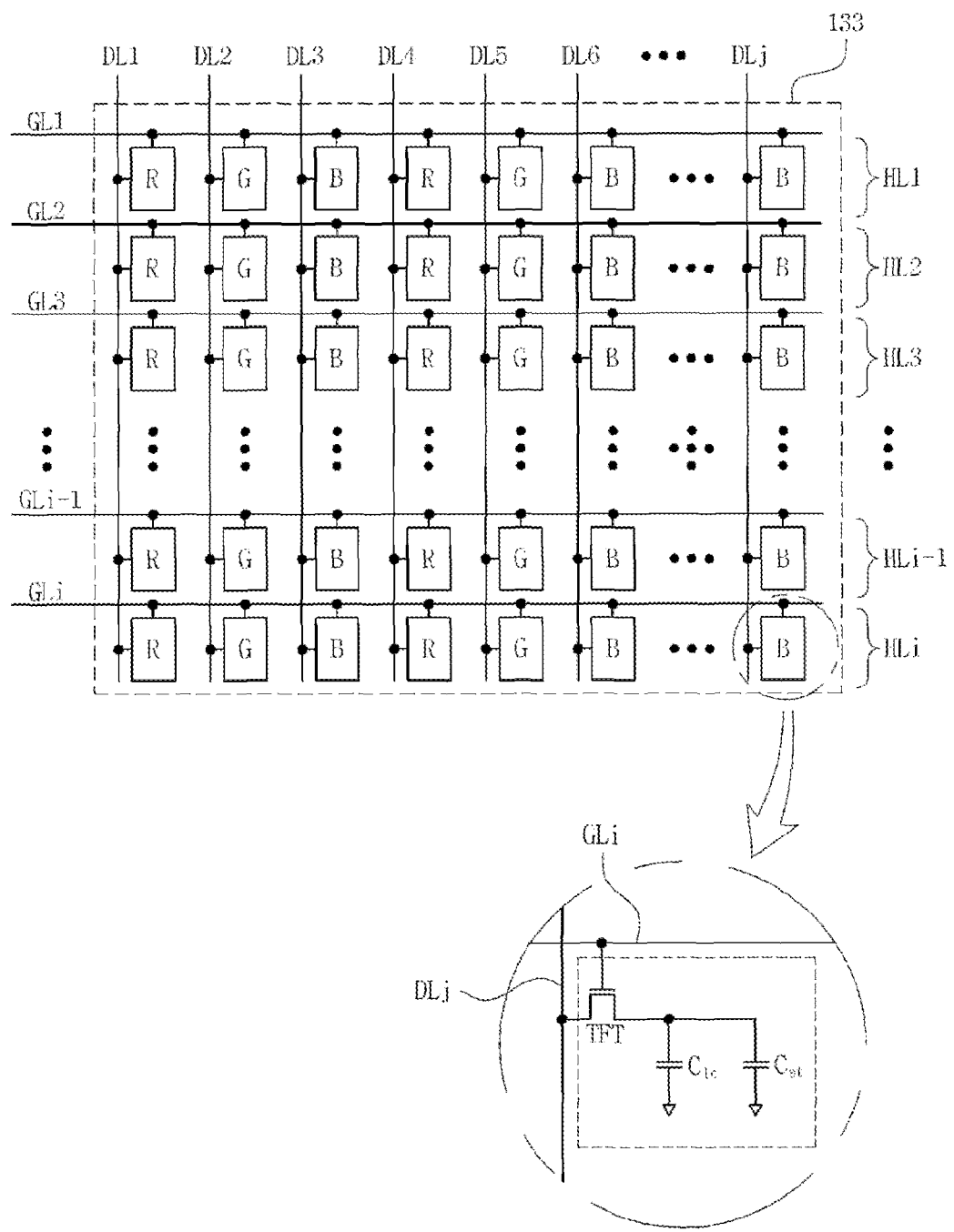
FIG. 2 is a detailed configuration view illustrating a display panel of FIG. 1.

FIG. 1 is a block diagram illustrating a display device according to an embodiment of the present invention. FIG. 2 is a detailed configuration view illustrating a display panel of FIG. 1.

A display device may include, as illustrated in FIG. 1, a display panel 133, a backlight unit 150, a backlight controller 158, a timing controller 101, a gate driver 112, a data driver 111, and a DC-DC converter 177.

The display panel 133 is configured to display an image. The display panel 133 may include, although not illustrated, a liquid crystal layer and lower and upper substrates opposed to each other with the liquid crystal layer interposed therebetween.

On the lower substrate, a plurality of gate lines GL1 to GLi, a plurality of data lines DL1 to DLj intersecting the gate lines GL1 to GLi, and thin film transistors connected to the gate lines GL1 to GLi and the data lines DL1 to DLj may be disposed.

Although not illustrated, a black matrix, a plurality of color filters, and a common electrode may be disposed on the upper substrate. The black matrix may be disposed on the upper substrate, except for an area corresponding to a pixel region. The color filters may be disposed on the pixel region. The color filters are categorized into red, green, and blue color filters.

Pixels R, G, and B may be arranged in a matrix form. The pixels R, G, and B may be categorized into red pixels R disposed corresponding to the red color filter, green pixels G disposed corresponding to the green color filter, and blue pixels B disposed corresponding to the blue color filter. In this case, the red, green, and blue pixels R, G, and B adjacently disposed in a horizontal direction may form a unit pixel to display a unit image.

J pixels arranged along an $n^{th}$ (n is a number selected from 1 to i) horizontal line (hereinafter, $n^{th}$ horizontal line pixels) may be respectively connected to the first to the $j^{th}$ data lines (DL1 to DLj). Further, the $n^{th}$ horizontal line pixels may be connected to the $n^{th}$ gate line together. Accordingly, the $n^{th}$ horizontal line pixels may receive an $n^{th}$ gate signal together. That is, j pixels arranged in the same horizontal line may receive the same gate signal, while pixels arranged in different horizontal lines may receive different gate signals. For example, both red and green pixels R and G disposed on the first horizontal line HL1 may receive a first gate signal, while red and green pixels R and G disposed on the second horizontal line HL2 may receive a second gate signal that has a different timing compared to the first gate signal.

Each of the pixels R, G, and B may include, as illustrated in FIG. 2, a thin film transistor TFT, a liquid crystal storage capacitor CLC, and an auxiliary storage capacitor Cst.

The TFT may be turned on according to a gate signal applied from the gate line. The turned-on TFT may supply an analog image data signal applied from the data line to the liquid crystal storage capacitor CLC and the auxiliary storage capacitor Cst.

The liquid crystal storage capacitor CLC may include a pixel electrode and a common electrode opposed to each other.

The auxiliary storage capacitor Cst may include a pixel electrode and an opposing electrode opposed to each other. Herein, the opposing electrode may be a previous gate line or a common line that may transmit a common voltage.

Meanwhile, among elements forming the pixels R, G, and B, the TFT may be covered by the black matrix.

The timing controller 101 is configured to receive a vertical synchronization signal Vsync, a horizontal synchronization signal Hsync, an image data signal DATA, and a clock signal DCLK outputted from a graphic controller provided in a system. An interface circuit (not illustrated) may be provided between the timing controller 101 and the system, and the signals outputted from the system are inputted to the timing controller 101 through the interface circuit. The interface circuit may be equipped in the timing controller 101.

Although not illustrated, the interface circuit may include an LVDS receiver. The interface circuit may lower voltage levels of the vertical synchronization signal Vsync, the horizontal synchronization signal Hsync, the image data signal DATA, and the clock signal DCLK outputted from the system, but also increase frequencies of the signals.

Meanwhile, due to a high-frequency component of the signal inputted from the interface circuit to the timing controller 101, electromagnetic interference may be caused therebetween. In order to prevent the interference, an EMI filter (not illustrated) may be further provided between the interface circuit and the timing controller 101.

The timing controller 101 may generate a gate control signal to control the gate driver 112 and a data control signal to control the data driver 111, using the vertical synchronization signal Vsync, the horizontal synchronization signal Hsync, and the clock signal DCLK. The gate control signal may include a gate start pulse, a gate shift clock, a gate output enable signal, and the like. The data control signal includes a source start pulse, a source shift clock, a source output enable signal, a polarity signal, and the like.

Further, the timing controller 101 may rearrange the image data signals DATA inputted from the system and supply the rearranged image data signals DATA' to the data driver 111.

Meanwhile, the timing controller 101 may be operated by a driving power Vcc outputted from a power unit provided in the system. In particular, the driving power Vcc is used as the power voltage of a phase lock loop PLL equipped in the timing controller 101. The phase lock loop PLL may compare the clock signal DCLK inputted to the timing controller 101 with a reference frequency generated from an oscillator. In a case where there is a difference between the compared values, the phase lock loop PPL may adjust the frequency of the clock signal by the difference to thereby produce a sampling clock signal. The sampling clock signal may be a signal to perform sampling of the image data signals DATA'.

The DC-DC converter 177 may increase or decrease the driving power Vcc inputted through the system to thereby produce voltages required for the display panel 133. For this purpose, the DC-DC converter 177 may include, for example, an output switching element for switching an output voltage of an output terminal thereof; and a pulse width modulator PWM for controlling a duty ratio or a frequency of a control signal applied to a control terminal of the output switching element so as to increase or decrease the output voltage. Herein, the DC-DC converter 177 may include a pulse frequency modulator PFM, instead of the pulse width modulator PWM.

The pulse width modulator PWM may increase a duty ratio of the above-described control signal to thereby increase the output voltage of the DC-DC converter 177 or decrease the duty ratio of the control signal to thereby lower the output voltage of the DC-DC converter 177. The pulse frequency modulator PFM may increase a frequency of the above-described control signal to thereby increase the output voltage of the DC-DC converter 177 or decrease the frequency of the control signal to thereby lower the output voltage of the DC-DC converter 177. The output voltage of the DC-DC converter 177 may include a reference voltage VDD of about 6[V] or more, a gamma reference voltage GMA1-10 of less than level 10, a common voltage in a range from about 2.5 to 3.3[V], a gate high voltage of about 15[V] or more, and a gate low voltage of −4[V] or less.

The gamma reference voltage GMA1-10 may be voltage produced by voltage division of the reference voltage. The reference voltage and the gamma reference voltage may be analog gamma voltages, and provided to the data driver 111. The common voltage may be applied to a common electrode of the display panel 133 via the data driver 111. The gate high voltage may be a high logic voltage of the gate signal, which is set to be a threshold voltage or higher of the TFT. The gate low voltage may be a low logic voltage of the gate signal, which is set to be an off voltage of the TFT. The gate high voltage and the gate low voltage may be applied to the gate driver 112.

The gate driver 112 is configured to produce gate signals according to a gate control signal GCS applied from the timing controller 101 and sequentially apply the gate signals to the plurality of gate lines GL1 to GLi. The gate driver 112 may include, for example, a shift register configured to shift a gate start pulse according to the gate shift clock to thereby produce a gate signals. The shift register may include a plurality of switching elements. The switching elements may be formed on a front surface of the lower substrate in the same process as in the TFT of a display area.

The data driver 111 is configured to receive the image data signals DATA' and a data control signal DCS from the timing controller 101. The data driver 111 may perform sampling of the image data signals DATA' according to the data control signal DCS, perform latching of the sampled image data signals corresponding to one horizontal line each horizontal period, and apply the latched image data signals to the data lines DL1 to DLj. That is, the data driver 111 may convert the image data signals DATA' applied from the timing controller 101 into analog image data signals using the gamma reference voltages GMA1-10 inputted from the DC-DC converter 177 and provides them to the data lines DL1 to DLj.

The backlight unit 150 is configured to provide light to the display panel 133. The backlight unit 150 may include a backlight 157 for emitting light and a backlight controller 158 for controlling the backlight 157.

Figure 3:
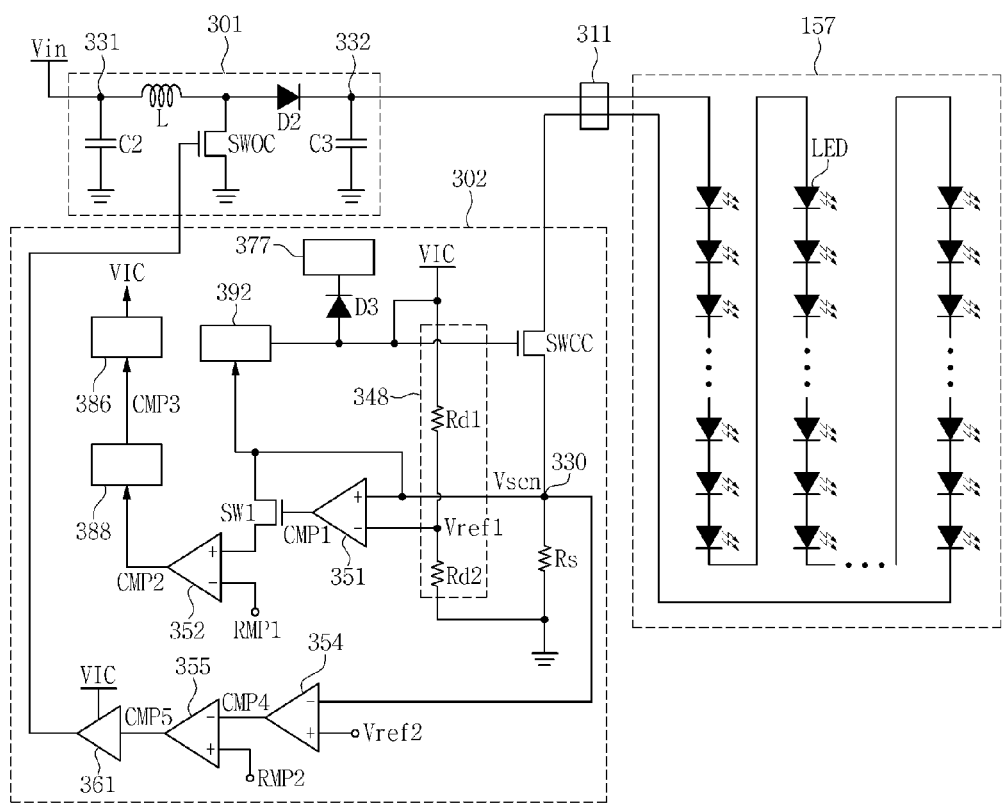
FIG. 3 is a detailed configuration view illustrating a backlight and a backlight controller of FIG. 1.

FIG. 3 is a detailed configuration view illustrating a backlight and a backlight controller of FIG. 1.

The backlight 157 may include, as illustrated in FIG. 3, at least one LED.

The LED is configured to receive a driving current generated based on a light source driving voltage applied from the backlight controller. The LED may emit light by the driving current. In a case where the backlight 157 includes a plurality of LEDs, the LEDs are connected between a power converter 301 and a current control switching element SWCC in series. In this case, the plurality of LEDs connected in series may be defined as a light source array. The light source array may be connected to the backlight controller through the connector 311.

The LED may be a light emission package including at least one LED. In some embodiments, one light emission package may include a red LED emitting red light, a green LED emitting green light, and a blue LED emitting blue light therein. The light emission package may combine light of three colors to produce white light. In some embodiments, the light emission package may include only a blue LED therein among the above-described LEDs of three colors. In this case, fluorescent members (e.g., phosphors) may be formed in a light emitting unit of the blue LED so as to convert blue light into white light.

Meanwhile, a laser diode or a carbon nanotube may be used as the LED, instead of the LED.

The backlight 157 may be one of a direct-lit backlight, an edge-lit backlight, and a corner-lit backlight.

The backlight controller 158 may adjust an amount of a driving current flowing through the LED to control luminance of light emitted from the LED.

The backlight controller 158 may include, as illustrated in FIG. 3, a power converter 301 and a light source controller 302.

The power converter 301 is configured to convert an externally applied input voltage Vin into a light source driving voltage. The light source driving voltage may be adjusted by the light source controller 302 to have a suitable voltage level to drive the plurality of LEDs.

The power converter 301 may include an inductor L, a diode D2, an input capacitor C2, an output capacitor C3, and an output control switching element SWOC.

The inductor L and the diode D2 may be connected between an input terminal 331 and an output terminal 332 of the power converter 301.

The input capacitor C2 may be connected between the input terminal 331 of the power converter 301 and ground.

The output capacitor C3 may be connected between the output terminal 332 of the power converter 301 and ground.

The output control switching element SWOC may be controlled by an externally supplied output control signal and connected between an anode electrode of the diode D2 and ground.

The power converter 301 having the above-described structure may convert an externally supplied input voltage Vin into a light source driving power voltage and outputs it. A voltage level of the light source driving voltage may be controlled by the output control signal. The light source driving voltage may have a voltage level increasing in accordance with an increase in a duty ratio of the output control signal. The light source driving voltage generated by the power converter 301 may be applied to the LED through the output terminal 332.

The light source controller 302 may include a sensing resistor Rs, a first comparator 351, a first switching element SW1, a second comparator 352, a fourth comparator 354, a fifth comparator 355, a buffer 361, a dimming controller 377, a current controller 392, a current control switching element SWCC, an abnormality detector 388, and a cut-off controller 386.

The sensing resistor Rs may be connected between a sensing node 330 and ground. When the driving current flows through the sensing resistor Rs, a sensing voltage Vsen may be generated across the sensing node 330 corresponding to the driving current.

The first comparator 351 is configured to compare the sensing voltage Vsen to a first reference voltage Vref1 and to output a first comparison signal CMP1 based on the comparison result. According to the comparison result, the first comparison signal CMP1 may have a high logic voltage or a low logic voltage.

The sensing voltage Vsen may be applied to a non-inverting input terminal (+) of the first comparator and the first reference voltage Vref1 may be applied to an inverting input terminal (−) of the first comparator 351.

When the sensing voltage Vsen may be greater than the first reference voltage Vref1, the first comparator 351 may produce an open collector output or an open drain output as the first comparison signal CMP1. The open collector output may correspond to the high logic voltage. For example, an additional resistor may be further connected between the inverting terminal (−) and the output terminal of the first comparator 351, and the open collector output, in this case, may be a reference power VIC divided by the additional resistor.

In contrast, when the sensing voltage Vsen may be less than or equivalent to the first reference voltage Vref1, the first comparator 351 produces a ground output as the first comparison signal CMP1. The ground output may correspond to the low logic voltage.

The first reference voltage Vref1 may be produced by a first voltage divider 348. That is, the first voltage divider 348 divides the reference voltage VIC to produce a first reference voltage Vref1. The first voltage divider 348 may include first and second voltage-dividing resistors Rd1 and Rd2. The reference voltage VIC may be applied to one terminal of the first voltage-dividing resistor Rd1. Another terminal of the first voltage-dividing resistor Rd1 may be connected to the inverting input terminal (−) of the first comparator 351. The second voltage-dividing resistor Rd2 may be connected between the inverting input terminal (−) of the first comparator 351 and ground.

The first switching element SW1 may be controlled by the first comparative signal CMP1 transmitted from the first comparator 351 and connected between the sensing node 330 and a non-inverting input terminal (+) of the second comparator 352. When the first comparison signal CMP1 is a high logic voltage as the open collector output, the first switching element SW1 supplied with the first comparison signal CMP1 may be turned on. In contrast, when the first comparison signal CMP1 is a low logic voltage as the ground output, the first switching element SW1 supplied with the first comparison signal CMP1 may be turned off.

The second comparator 352 is configured to compare the sensing voltage Vsen inputted through the first switching element SW1 to a first ramp signal RMP1 and output a second comparison signal CMP2 based on the comparison result. According to the comparison result, the second comparison signal CMP2 may have a high logic voltage or a low logic voltage.

The sensing voltage Vsen may be applied to the non-inverting input terminal (+) of the second comparator 352 through the switching element SW1 and the first ramp signal RMP1 may be applied to an inverting input voltage (−) of the second comparator 352.

When the sensing voltage Vsen is greater than the first ramp signal RMP1, the second comparator 352 may output a second comparison signal CMP2 having a high logic voltage. In contrast, when the sensing voltage Vsen is less than or equivalent to the first ramp signal RMP1, the second comparator 352 may output a second comparison signal CMP2 having a low logic voltage.

Although not illustrated, the first ramp signal RMP1 may be outputted from a first oscillator. The first oscillator may receive the reference voltage VIC to thereby produce a first ramp signal RMP1.

The current control switching element SWCC may control a driving current based on the reference voltage VIC and the current control signal.

The current control signal may be outputted from the current controller 392. The current controller 392 may produce a static current control signal based on the sensing voltage Vsen of the sensing node 330. That is, the current controller 392 may compare the sensing voltage Vsen to the reference voltage to thereby control amplitude of the current control signal based on the comparison result.

The abnormality detector 388 may convert the second comparison signal CMP2 applied from the second comparator 352 into a direct current (DC) voltage. Then, the abnormality detector 388 may compare the DC voltage to a critical voltage and output a third comparison signal CMP3 based on the comparison result. Based on the comparison result, the third comparison signal CMP3 may have a high logic voltage or a low logic voltage.

The cut-off controller 386 is configured to compare the third comparison signal CMP3 applied from the abnormality detector 388 to a cut-off voltage to thereby control the reference power VIC based on the comparison result. When the third comparison signal CMP3 is greater than the cut-off voltage, the cut-off controller 386 may drop the reference power VIC to a ground voltage level.

The fourth comparator 354 is configured to compare the sensing voltage Vsen to a second reference voltage Vref2 to thereby output a fourth comparison signal CMP4 based on the comparison result. According to the comparison result, the fourth comparison signal CMP4 may have a high logic voltage or a low logic voltage. Herein, the second reference voltage Vref may be a voltage divided from the reference power VIC.

The fifth comparator 355 is configured to compare the fourth comparison signal CMP4 applied from the fourth comparator 354 to a second ramp signal RMP2 to thereby output a fifth comparison signal CMP5 based on the comparison result. According to the comparison result, the fifth comparison signal CMP5 may have a high logic voltage or a low logic voltage.

Although not illustrated, the second ramp signal RMP2 may be outputted from a second ramp oscillator. The second oscillator is configured to receive the reference power VIC and to generate a second ramp signal RMP2. Meanwhile, the first and second ramp signals RMP1 and RMP2 may have different frequencies. In this case, the second ramp signal RMP2 may have a higher frequency than the first ramp signal RMP1. For instance, when the second ramp signal RMP2 has a frequency in a range of about 100 to 150 [kHz], the first ramp signal RMP1 may have a frequency in a range of about 20 to 50 [kHz].

The buffer 361 may perform buffering of the fifth comparison signal CMP5 applied from the fifth comparator 355 based on the reference voltage VIC to output a buffered signal. The buffered signal outputted from the buffer 361 may be the output control signal.

A configuration of the abnormality detector 388 is described below in more detail with reference to FIG. 4.

Figure 4:
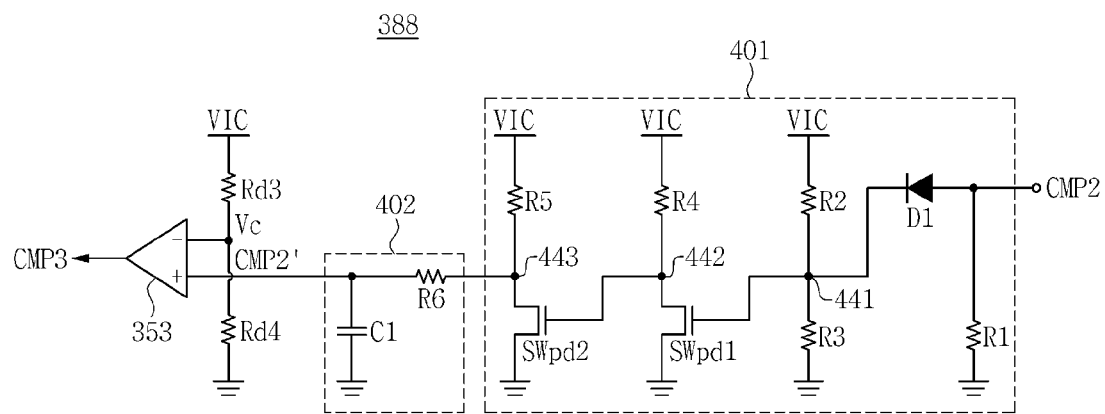
FIG. 4 is a detailed configuration view illustrating an abnormality detector of FIG. 3.

FIG. 4 is a detailed configuration view illustrating the abnormality detector 388 of FIG. 3.

The abnormality detector 388 may include, as illustrated in FIG. 4, a level shifter 401, an integrator 402, and the third comparator 353.

The level shifter 401 is configured to perform modulation of a level of the second comparison signal CMP2 applied from the second comparator 352.

The level shifter 401 may include a first resistor R1, a diode, a second resistor R2, a third resistor R3, a fourth resistor R4, a first pull-down switching element SWpd1, and a second pull-down switching element SWpd2.

The first resistor R1 may be connected between a first node 441 and ground.

The diode D1 may be connected between an output terminal of the second comparator 352 and the first node 441.

The reference voltage VIC may be applied to one terminal of the second resistor R2 and another terminal of the second resistor R2 is connected to the first node 441.

The third resistor R3 may be connected between the first node 441 and ground.

The reference voltage VIC may be applied to one terminal of the fourth resistor R4 and another terminal of the fourth resistor R4 may be connected to a second node 442.

The first pull-down switching element SWpd1 may be controlled by voltage of the first node 441 and connected between the second node 442 and ground.

The reference voltage VIC may be applied to one terminal of the fifth resistor R5 and another terminal of the fifth resistor R5 may be connected to a third node 443.

The second pull-down switching element SWpd2 may be controlled by voltage of the second node 442 and connected between the third node 443 and ground.

The integrator 402 is configured to integrate the second comparison signal CMP2 applied from the level shifter 401.

The integrator 402 may include a resistor R6 and a capacitor C1.

The resistor R6 may be connected between the second node 442 and a non-inverting input terminal (+) of the third comparator 353.

The capacitor C1 may be connected between the non-inverting input terminal (+) of the third comparator 353 and ground.

The third comparator 353 is configured to compare the second comparison signal CMP2 integrated by the integrator 402 to the critical voltage Vc and to output a third comparison signal CMP3 based on the comparison result. According to the comparison result, the third comparison signal CMP3 may have a high logic voltage or a low logic voltage.

The critical voltage Vc may be produced from the second voltage divider including a third voltage-dividing resistor Rd3 and a fourth voltage-dividing resistor Rd4. That is, the second voltage divider may divide the reference power VIC to thereby produce the critical voltage Vc. The reference power VIC may be applied to one terminal of the third voltage-dividing resistor Rd3. Another terminal of the third voltage-dividing resistor Rd3 may be connected to an inverting input terminal (−) of the third comparator 353. The fourth voltage-dividing resistor Rd4 may be connected between the inverting input terminal (−) of the third comparator 353 and ground.

Meanwhile, the dimming controller 377 illustrated in FIG. 3 is configured to receive the reference voltage VIC to produce a dimming signal. The dimming signal applied from the dimming controller 377 may be applied to the current control switching element SWCC. The dimming signal may be a pulse width modulation signal. Turn-on and turn-off of the current control switching element SWCC may be controlled according to a duty ratio of the dimming signal.

The diode D3 may be connected between the dimming controller 377 and the current control switching element SWCC. In this case, a cathode terminal of the diode D3 is connected to an output terminal of the dimming controller 377 and an anode terminal thereof is connected to a gate terminal of the current control switching element SWCC.

An operation of the backlight unit 150 having the above-described structure is described in more detail with reference to FIGS. 3 to 5.

Figure 5:
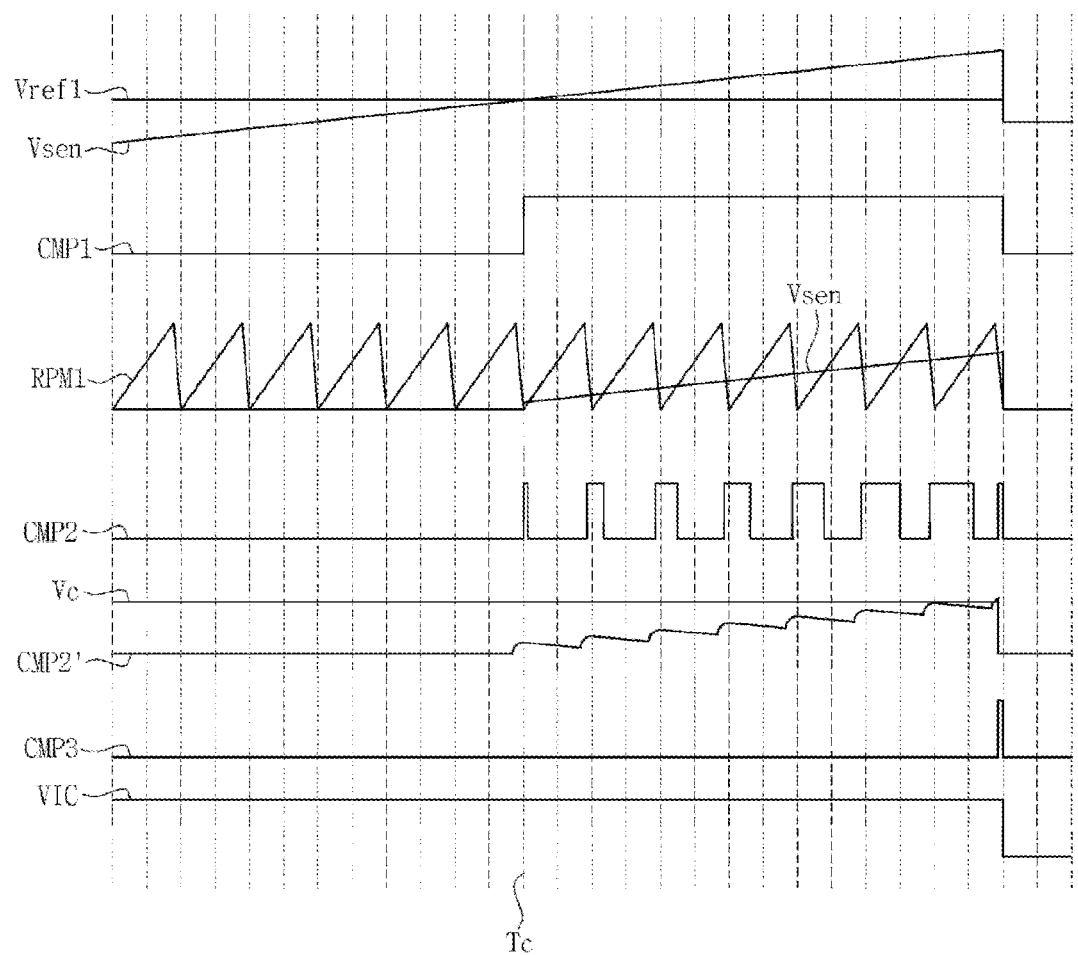
FIG. 5 is a waveform diagram illustrating wavelengths of a plurality of signals in connection with operation of elements illustrated in FIGS. 3 and 4.

FIG. 5 is a waveform diagram illustrating wavelengths of a plurality of signals in connection with operation of elements illustrated in FIGS. 3 and 4.

When a short circuit occurs between the anode and cathode terminals of the LED due to an abnormal connection of the connector 311, the light source driving voltage applied from the power converter 301 may be directly applied to the current control switching element SWCC. Accordingly, a substantially large amount of the driving current may flow through the current control switching element SWCC, such that a sensing voltage Vsen of the sensing node 330 may be, as illustrated in FIG. 5, significantly increased. At a time point Tc when the sensing voltage Vsen exceeds the first reference voltage Vref1, the first comparator 351 may produce the first comparison signal CMP1 having a high logic voltage. The first comparison signal CMP1 having the high logic voltage produced by the first comparator 351 may be applied to a gate terminal of the first switching element SW1.

The first switching element SW1 may be turned on in response to the first comparison signal CMP1 having the high logic voltage. Then, the sensing voltage Vsen may be applied to the second comparator 352 through the turned-on first switching element SW1.

The second comparator 352 is configured to compare the sensing voltage Vsen to the first ramp signal RMP1. In a period where the sensing voltage Vsen is greater than the first ramp signal RMP1, the second comparison signal CMP2 having a high logic voltage may be outputted. In a period where the sensing voltage Vsen is less than or equivalent to the first ramp signal RMP1, the second comparison signal CMP2 having a low logic voltage may be outputted. In this case, the sensing voltage Vsen is linearly increased, and thus the second comparison signal CMP2 outputted from the second comparator 352 may have, as illustrated in FIG. 5, a pulse wavelength with a duty ratio gradually increasing over time. In this case, the frequency of the second comparison signal CMP2 may be adjusted in accordance with the frequency of the first ramp signal RMP1. The second comparison signal CMP2 generated by the second comparator 352 may be inputted to the abnormality detector 388.

Hereinafter, the operation of the abnormality detector 388 is described in detail with reference to FIGS. 4 and 5.

The second comparison signal CMP2 may be applied to the first node 441 through the diode D1. Herein, when the second comparison signal CMP2 has a high logic voltage, a forward voltage may be applied to the diode and the second comparison signal CMP2 having the high logic voltage is applied to the first node 441.

When the second comparison signal CMP2 having the high logic voltage is applied to the first node 441, the first pull-down switching element SWpd1 connected to the first node 441 through the gate terminal may be turned on. A ground voltage may be then applied to the second node 442 through the turned-on first pull-down switching element SWpd1, and thus the second node 442 may be discharged. Accordingly, the second pull-down switching element SWpd2 connected to the discharged second node 442 through the gate terminal may be turned off. Accordingly, the reference voltage VIC may be divided according to a resistance ratio of the fifth and sixth resistors R5 and R6 and the divided reference power VIC (hereinafter "divided voltage") may be applied to the third node 443. In other words, when the second comparison signal CMP2 having the high logic voltage is applied to the first node 441, the second comparison signal CMP2 of which the high logic voltage may be converted to a voltage level of the divided voltage is outputted. Herein, the divided voltage may be greater than or less than the high logic voltage.

In contrast, when the second comparison signal CMP2 has a low logic voltage, a backward voltage may be applied to the diode, and thus the second comparison signal CMP2 having the low logic voltage may not be applied to the first node 441. Accordingly, the output terminal of the second comparator 352 and the first node 441 may be electrically separated.

Then, the reference power VIC divided according to the resistance ratio of the second and third resistors R2 and R3 may be applied to the first node 441. The divided reference power is set to be a value smaller than a threshold voltage of the first pull-down switching element SWpd1. Accordingly, when the second comparison signal CMP2 has a low logic voltage, the first pull-down switching element SWpd1 may be turned off. Accordingly, when the reference power VIC is applied to the second node 442 to thereby charge the second node 442, the second pull-down switching element SWpd2 of which a gate terminal may be connected to the charged second node 442 is turned on. Then, a ground voltage may be applied to the third node 443 through the turned-on second pull-down switching element SWpd2, thereby discharging the third node 443. Accordingly, if the second comparison signal CMP2 having a low logic voltage is applied to the first node 441, a ground voltage may be applied to the third node 443.

The integrator 402 including the sixth resistor R6 and the capacitor C1 is configured to integrate a pulse voltage applied to the third node 443 to thereby convert the voltage into a DC voltage CMP2'. The converted DC voltage CMP2' may be applied to the non-inverting input terminal (+) of the third comparator 353. In this case, a duty ratio of the second comparison signal CMP2 may be linearly increased after the time point Tc, and thus the DC voltage CMP2' may be gradually increased after the time point Tc, as illustrated in FIG. 5.

The third comparator 353 is configured to compare the DC voltage CMP2' to the critical voltage Vc. At a time point when the DC voltage CMP2' is gradually increased to exceed the critical voltage, the third comparator 353 may output a third comparison signal CMP3 having a high logic voltage. The third comparison signal CMP3 having a high logic voltage may be inputted to the cut-off controller 386.

The cut-off controller 386 is configured to drop the reference power VIC to the ground voltage level, that is 0 [V], in response to the third comparison signal CMP3 having a high logic voltage.

When the reference power VIC is dropped to the ground voltage level, the elements operated with the supplied reference power VIC may stop operation. For instance, the current control switching element SWCC, the buffer 361, the first voltage divider 348, and the abnormality detector 388 may stop operation. Accordingly, as illustrated in FIG. 5, shortly after the third comparison signal CMP3 is converted into a high logic voltage, all signals may be dropped to the ground voltage level. In some embodiments, all signals may be dropped to the ground voltage level on falling edges of the third comparison signal CMP3. Accordingly, although a short circuit occurs due to abnormal connection of the connector 311, an amount of the driving current may be suppressed, thereby capable of preventing damage on elements such as the sensing resistor.

In addition, when a short circuit occurs, a duty ratio of the second comparison signal CMP2 may be increased in accordance with an increase of the sensing voltage Vsen, such that the reference power VIC can be more quickly cut-off.

Further, in the case of abnormality, the reference power VIC may not be immediately cut off. Whether to cut-off the reference power VIC or not is determined based on an increase tendency of the sensing voltage Vsen, thereby capable of preventing stopping of operation of the backlight unit owing to a simple ephemeral noise.

Figure 6:
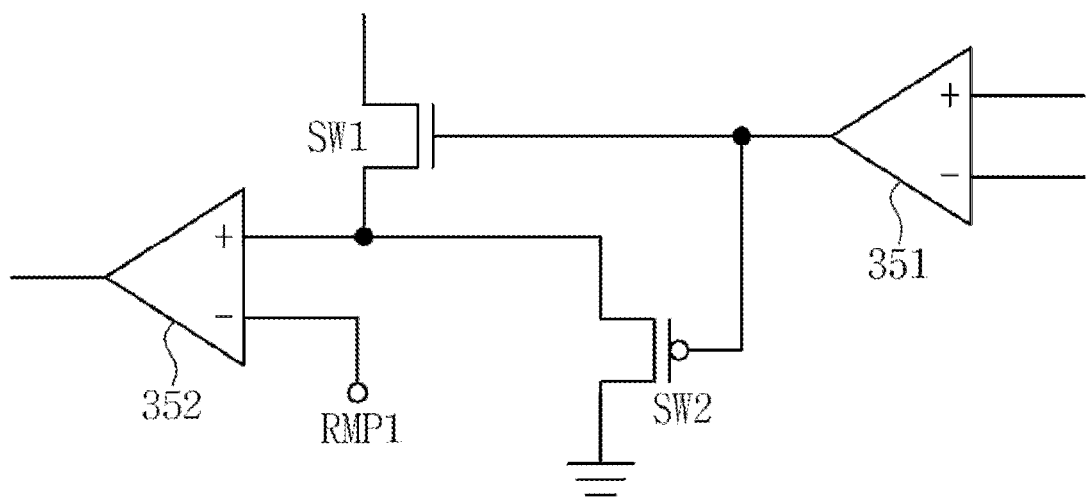
FIG. 6 is a view illustrating another configuration of a light source controller illustrated in FIG. 3.

FIG. 6 is a view illustrating another configuration of the light source controller illustrated in FIG. 3.

The light source controller 302 may further include, as illustrated in FIG. 6, a second switching element SW2.

The second switching element SW2 may operate in the opposite way compared to the first switching element SW1. That is, when the first switching element SW1 is turned on, the second switching element SW2 may be turned off. Further, when the first switching element SW1 is turned off, the second switching element SW2 may be turned on. For this purpose, the first switching element SW1 may be an n-type transistor and the second switching element SW2 may be a p-type transistor. Vice versa is of course possible.

The second switching element SW2 may be controlled by the first comparison signal CMP1 applied from the first comparator 351 and connected to the non-inverting input terminal (+) of the first comparator 351. When the first comparison signal CMP1 is a low logic voltage, the second switching element SW2 may be turned on. The turned-on second switching element SW2 may discharge the non-inverting input terminal (+) of the second comparator 352 to a ground voltage level.

In normal operation of the backlight unit, the non-inverting input terminal (+) of the second comparator 352 may be maintained at voltage lower than voltage of the inverting input terminal (−) by the second switching element SW2.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:
1. A backlight unit comprising:
a light source configured to emit light based on a driving current;
a sensing resistor configured to generate a sensing voltage based on the driving current;
a first comparator configured to compare the sensing voltage to a first reference voltage divided from a reference power to thereby produce a first comparison signal;
a first switching element controlled by the first comparison signal applied from the first comparator to thereby switch the sensing voltage;
a second comparator configured to compare the sensing voltage applied via the first switching element to a first ramp signal to thereby produce a second comparison signal;
a current control switching element configured to control an amount of the driving current based on the reference power and a current control signal applied from a current controller;
an abnormality detector configured to convert the second comparison signal applied from the second comparator into a DC voltage and to compare the DC voltage to a critical voltage to thereby generate a third comparison signal; and
a cut-off controller configured to compare the third comparison signal applied from the abnormality detector to a cut-off voltage to control the reference power based on the comparison result.

2. The backlight unit of claim 1, further comprising a first voltage divider configured to generate the first reference voltage.

3. The backlight unit of claim 2, wherein the first voltage divider comprises;
a first voltage-dividing resistor configured to receive the reference power through one terminal and connected to an input terminal of the first comparator through another terminal; and
a second voltage-dividing resistor connected between the input terminal of the first comparator and ground.

4. The backlight unit of claim 1, wherein the cut-off controller drops the reference power to a ground voltage level, when the third comparison signal is greater than the critical voltage.

5. The backlight unit of claim 1, wherein the abnormality detector comprises; a level shifter configured to perform modulation of a voltage level of the second comparison signal applied from the second comparator;
an integrator configured to integrate the second comparison signal applied from the level shifter; and
a third comparator configured to compare the second comparison signal applied from the integrator to the critical voltage to generate the third comparison signal.

6. The backlight unit of claim 5, wherein the level shifter comprises:
a first resistor connected between an output terminal of the second comparator and ground;
a first diode connected between the output terminal of the second comparator and a first node;
a second resistor configured to receive the reference power through one terminal and connected to the first node through another terminal;
a third resistor connected between the first node and ground;
a fourth resistor configured to receive the reference power through one terminal and connected to a second node through another terminal;
a first pull-down switching element controlled by voltage of the first node and connected between the second node and ground;
a fifth resistor configured to receive the reference power through one terminal and connected to a third node through another terminal; and
a second pull-down switching element controlled by voltage of the second node and connected between the third node and ground.

7. The backlight unit of claim 6, wherein the integrator comprises:
a sixth resistor connected between the second node and an input terminal of the third comparator; and
a first capacitor connected between the input terminal of the third comparator and ground.

8. The backlight unit of claim 5, further comprising a second voltage divider configured to generate the critical voltage.

9. The backlight unit of claim 8, wherein the second voltage divider comprises:
a third voltage-dividing resistor configured to receive the reference power through one terminal and connected to the input terminal of the third comparator through another terminal; and
a fourth voltage-dividing resistor connected between the input terminal of the third comparator and ground.

10. The backlight unit of claim 1, further comprising a power converter configured to convert an externally applied input voltage into a light source driving voltage and apply the light source driving voltage to the light source.

11. The backlight unit of claim 10, wherein the power converter comprises:
an inductor and a second diode connected in series between an input terminal and an output terminal of the power converter;
a second capacitor connected between the input terminal of the power converter and ground;
a third capacitor connected between the output terminal of the power converter and ground; and
an output control switching element controlled by an externally supplied output control signal and connected between an anode electrode of the second diode and ground.

12. The backlight unit of claim 11, further comprising:
a fourth comparator configured to compare the sensing voltage to a second reference voltage to thereby produce a fourth comparison signal;
a fifth comparator configured to compare the fourth comparison signal applied from the fourth comparator to a second ramp signal to produce a fifth comparison signal; and
a buffer configured to perform buffering of the fifth comparison signal applied from the fifth comparator using the reference power to thereby produce a light source control signal.

13. The backlight unit of claim 12, further comprising first and second oscillators configured to receive the reference power to produce first and second ramp signals.

14. The backlight unit of claim 12, wherein the second ramp signal has a frequency higher than a frequency of the first ramp signal.

15. The backlight unit of claim 1, further comprising a dimming controller configured to receive the reference power to produce a dimming signal and to apply the dimming signal to the current control switching element.

16. The backlight unit of claim 15, further comprising a third diode connected between the dimming controller and the current control switching element.

17. The backlight unit of claim 1, wherein the light source comprises at least one light emitting diode.

18. The backlight unit of claim 1, further comprising a second switching element operating reversely to the first switching element,
wherein the second switching element is controlled by the first comparison signal applied from the first comparator and connected between ground and a connecting point of the first switching element and the input terminal of the first comparator.

* * * * *